United States Patent [19]

Chi-Jung

[11] 4,290,537
[45] Sep. 22, 1981

[54] VOLUME AND TEMPERATURE INDICATORS FOR INSULATED AIR POT

[76] Inventor: Lo Chi-Jung, No. 28, Lane 223, Lung Chiang Rd., Taipei, Taiwan

[21] Appl. No.: 81,318

[22] Filed: Oct. 3, 1979

[51] Int. Cl.³ .......................... B67D 5/22; G01F 13/00
[52] U.S. Cl. ..................................... 222/25; 222/51; 222/401; 73/292
[58] Field of Search .................. 73/292, 320; 116/228; 222/51, 25, 401

[56] References Cited

U.S. PATENT DOCUMENTS

| | | | |
|---|---|---|---|
| 1,238,231 | 8/1917 | Wentz | 73/320 |
| 1,330,457 | 2/1920 | Wicke | 73/292 |
| 1,616,934 | 2/1927 | Tyden | 73/320 |
| 1,776,170 | 9/1930 | Thimblethorpe | 73/292 |
| 2,320,731 | 6/1943 | Hooper et al. | 73/292 |
| 3,451,371 | 6/1969 | Bramlette | 116/228 |
| 3,654,891 | 4/1972 | Aas et al. | 73/320 X |
| 3,968,904 | 7/1976 | Neville | 222/25 |
| 4,116,366 | 9/1978 | Takenakashima et al. | 222/401 X |
| 4,129,039 | 12/1978 | Pignato | 73/320 X |
| 4,229,798 | 10/1980 | Rosie et al. | 73/149 |

FOREIGN PATENT DOCUMENTS 597699 5/1924 France .................................. 73/292

*Primary Examiner*—Daniel M. Yasich
*Attorney, Agent, or Firm*—Robert E. Burns; Emmanuel J. Lobato; Bruce L. Adams

[57] ABSTRACT

An insulated air pot for hot water and the like has a hinged circular cap on the top of which there are arcuate indicators showing the volume and temperature of the liquid in the pot. The volume indicator comprises an indicator hand coupled with the upper end of a twisted strip which slides in a slot in a float member so that it is rotated as the float member rises or falls. The temperature indicator comprises a thermometer of arcuate shape having a bulb in the upper end of a heat conducting conduit. A ball valve at the top of a discharge pipe closes the pipe except when liquid is being discharged and thereby conserves heat.

8 Claims, 5 Drawing Figures

Fig.1

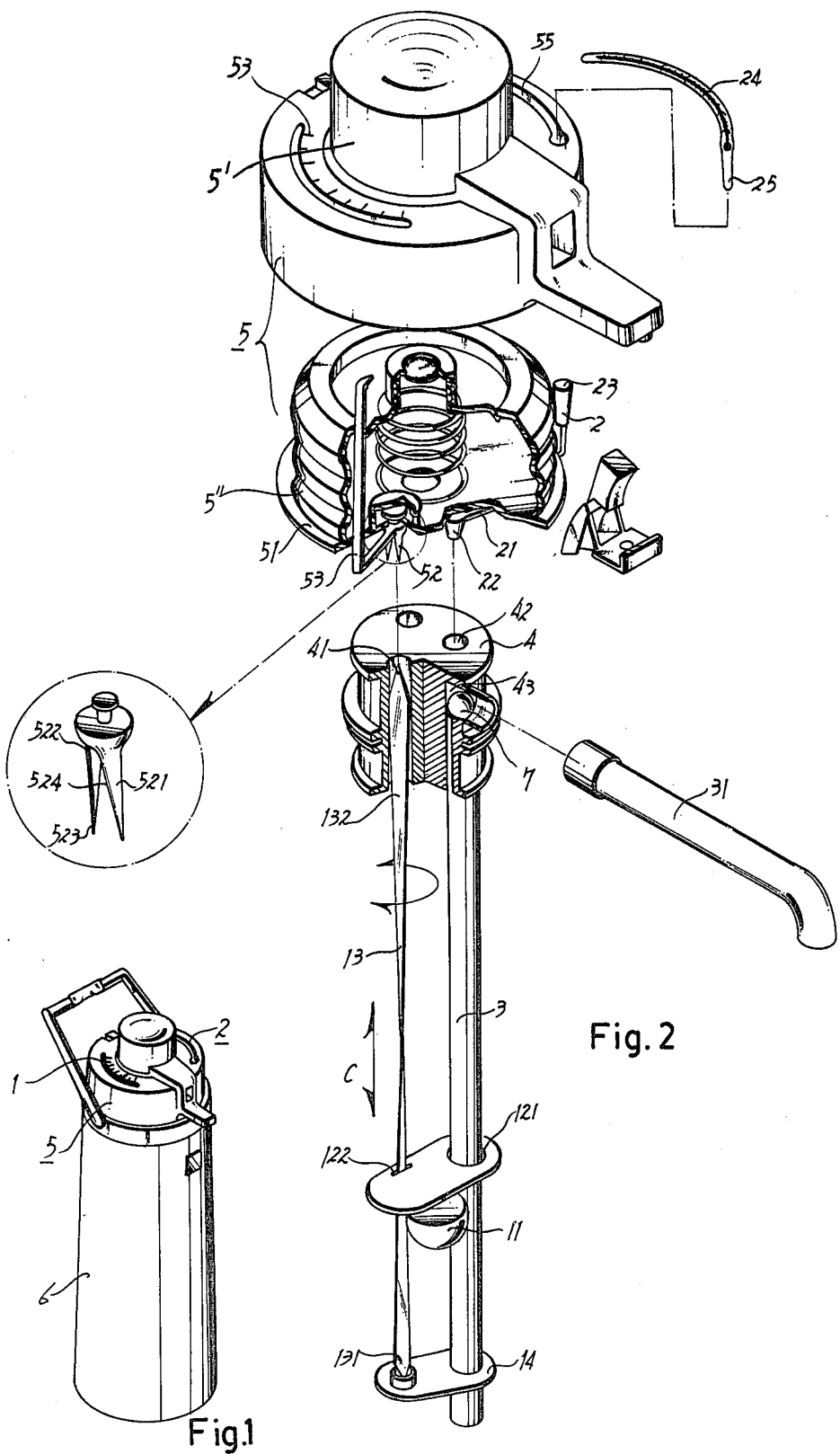

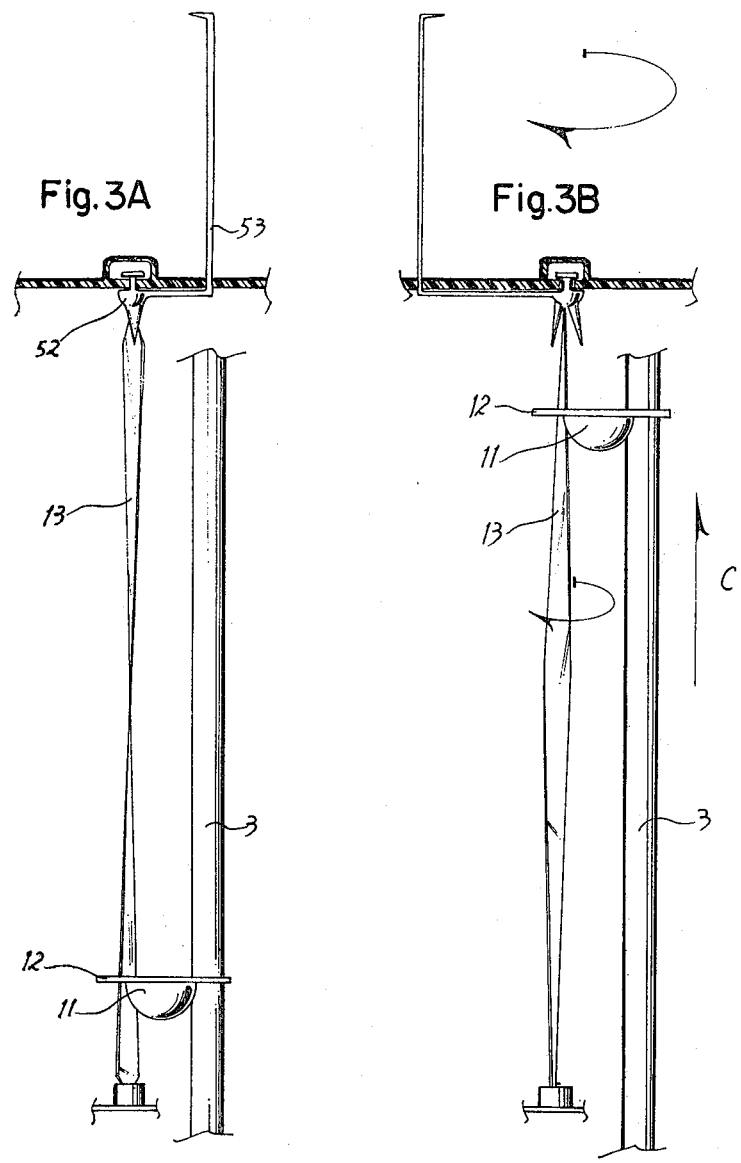
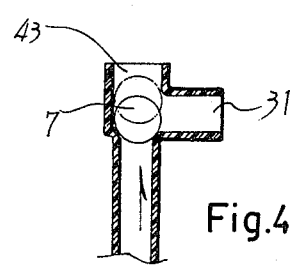

VOLUME AND TEMPERATURE INDICATORS FOR INSULATED AIR POT

BACKGROUND OF THE INVENTION

An ordinary air pot can discharge water simply by pressing. However, its pressure conduit, water conduit and water outlet are open and in daily application, the water is not insulated from the environment so that water temperature can not be maintained for a long time. Once hot water is poured in, the water becomes warm after a certain period because of cooling. Furthermore, when water is to be discharged from an air pot, it is not possible to find the temperature and volume of the water therein till pressure is applied and the water is discharged. Hence it may be found that the water is insufficient or the temperature is not high enough for preparing a cup of hot coffee, or milk. There are thus a plurality of inconveniences in application, which are defects of an ordinary air pot.

SUMMARY OF THE INVENTION

The invention relates to a new design of air pot, especially one with volume and temperature indicators as well as a thermal insulating device. It comprises a volume indicator, temperature indicator and a ball which closes the discharge pipe except when water is being discharged.

The invention is an improvement of an ordinary thermal bottle in that it will indicate water volume and temperature externally and there is a ball which is placed at a terminal of the water conduit pipe to insulate water from the environment for the purpose of retaining the water temperature.

A major objective of the invention is to overcome defects such as those mentioned above and to provide water volume and temperature indicators. Water volume is indicated by means of a float in the pot and a spiral band which is turned by the float. Water temperature is indicated through an arcuate thermometer.

Another objective of the invention is to provide a ball which is freely placed on a terminal of the water conduit pipe and through selection of the weight of such ball, it will float up when pressure is applied so that water can be discharged through the pipe and as soon as pressure is released, it drops on the pipe terminal as a seal so that water in the pot is insulated from the environment and therefore its temperature is maintained.

BRIEF DESCRIPTION OF DRAWINGS

Characteristics and structure of the invention are described in detail as follows with reference to the drawings attached. In the drawings:

FIG. 1 is a perspective view of an air pot according to the present invention;

FIG. 2 is an exploded perspective view of the air pot of FIG. 1;

FIGS. 3A and 3B are sectional views of the water volume indicator of the air pot of FIG. 1, and FIG. 4 is a part sectional view showing the thermal insulating ball of the air pot of FIG. 1.

DETAILED DESCRIPTION OF THE PREFERRED EMBODIMENT

FIG. 1 illustrates the appearance of an air pot in accordance with the invention. FIG. 2 illustrates a disassembled structure of the air pot. FIGS. 3A and 3B illustrate a water volume indicator. FIG. 4 illustrates the device of the thermal insulating ball. As shown in FIGS. 1 and 2, the air pot comprises a cylindrical pot body (6) the upper end of which is closed by a cap (5). A discharge pipe (3) extends down from an interior body (4) of the pot cap almost to the bottom of the pot. The upper end of the pipe (3) connects with a discharge spout 31. An arcuate volume indicator (1) and arcuate temperature indicator (2) are designed on the top of the pot cap (5) of pot body (6). They show water reserves and the temperature of water in the pot so that one can know them prior to discharge of water. The volume indicator consists of a hollow float (11) made of light material. Such float (11) is connected to a sliding plate (12) which has a hole (121) to receive the water conduit pipe (3) in air pot so that it can move up and down along the conduit pipe (3) as indicated by arrow C. In the plate (12) there is also a rectangular slot (122) with adequate width. Within the slot (122) there is a spiral band (13) and the whole spiral band has only a turn along its whole length. At its bottom end (131) the spiral band (13) is rotatably supported by a bracket (14) on the bottom end of conduit pipe (3) and the upper end (132) of the spiral band (13) is the round hole (41) of pot cap body (4) in which said band can rotate freely received in said round hole (41). The round hole (41) is aligned with a conical body (52) at bottom (51) of pot cap (5). The pot cap (5), as shown in the attached drawing, comprises a pressure part (5)' and a compressible air chamber (5)". The pot cap (5) is connected with the pot body by means of a hinge. In order to allow the conical body (52) which matches with the round hole (41) to be connected with the spiral band (13) whenever the pot is covered, the conical body (52) has two conical parts (521) and (522) with tips (523) and with an oblique space (524) between them, and the whole body (52) is rotatable on the bottom of (51) of pot cap (5). When the pot is covered with pot cap (5), the spiral band (13) can be held in the oblique space (524) so that the spiral band (13) can rotate following the up and down movement of float (11) and thus, conical body (52) is rotated as shown in FIG. 3. The conical body (52) is linked with an indicator (53) on the pot cap. Therefore, the arcuate engraved line (54) of the volume indicator (1) can show water volume remained in the pot and then, one can know the exact quantity of water in the pot by just watching its external.

The temperature indicator (2) comprises a heat conductor (24) and a thermal sensor (25) which are in a sealed state without contacting the environment so that temperature of water can be shown on the pot cap. The heat conductor is made 95 a conduit (21) of good thermal insulative material and the bottom terminal of the conduit (21) has a conical lower opening (22). The lower opening (22) is fixed to the bottom (51) of the cap and it matches with an air hole (42) in the interior body (4) of pot cap (5) so that the air hole (42) is sealed by the conical lower opening (22) and leakage is prevented. Steam travels through lower opening (22), conduit (21) and then upper opening (23). The upper opening (23) is also of conical form. The thermal sensing glass tube (25) of a thermometer (heat conductor (24)) is inserted into the upper opening (23) so that it is heated by the steam. Then, the thermometer (24) indicates the temperature of water in the pot. The scale of the thermometer is of arcuate form in an arcuate groove (55) on the pot cap (5) so that the thermometer (24) can be protected and used as an indicator (2) for water temperature.

For thermal insulation purpose, the invention comprises a ball (7) in the interior body (4) of pot cap (5). An ordinary air pot does not have good thermal insulation properties since when it is pressed for discharging water, the conduit pipe (31) is open to the interior space (43) and water in the pot disperses heat energy to the environment, which is dispersed even when the pot is not being pressed. The invention has a ball (7) which is made of thermal resistant and poisonless material on the upper terminal of water conduit pipe (3). The ball (7) has an appropriate weight and its diameter is slightly bigger than the inner diameter of conduit pipe (3) so that when pressure is applied, the pressure can float the ball (7) and water discharge is possible. When no pressure is applied (i.e. in normal condition), the ball (7) falls on the opening of conduit pipe (3) by its own weight, as shown in FIG. 4. Since it is a spherical structure, thermal energy is insulated thereby and the purpose of thermal insulation is attained.

The water volume and temperature indicators as well as the thermal insulation device are designed for the air pot so that application of the air pot is simple and practical.

I claim:

1. An insulated portable air pot for dispensing liquid, comprising a pot body having an opening at the top, a detachable circular cap closing said opening of said pot and having and upper face, a liquid discharge pipe extending from said cap down into said pot body, and a discharge spout connected with the upper end of said discharge pipe, said cap having a compressible air chamber and a central push portion for compressing said air chamber to force air into said pot body and thereby force liquid up through said discharge pipe and out through said spout, arcuate volume indicating means in the upper face of said cap approximately concentric with said cap, arcuate temperature indicating means in the upper face of said cap approximately concentric with said cap and opposite said volume indicating means, means in said pot for measuring the volume of liquid in said pot and detachable connecting means for transmitting said volume measurement to said volume indicating means, and means for transmitting the temperature of liquid in said pot to said temperature indicating means.

2. An insulated pot according to claim 1, in which said temperature indicating means comprises an arcuate groove in said cap top and an arcuate thermometer disposed in said groove and having at one end a downwardly extending bulb portion.

3. An insulated pot according to claim 2, in which, said temperature transmitting means comprises an insulating conduit in said cap, said conduit having at its upper end conical opening in which said bulb of said thermometer is received and having at its lower end a downwardly facing conical opening exposed to the fluid temperature in said pot.

4. An insulated air pot according to claim 1, in which said volume indicating means comprises an arcuate slot in the top of said cap, a volume-indicating scale extending along said slot and an indicator pivotally mounted in said cap concentrically with said slot and having a pointed end received in said slot and cooperating with said scale to indicate the volume of liquid in said pot.

5. An insulated air pot according to claim 4, in which said volume measuring means comprises float means in said pot, means for guiding said float means for vertical movement in said pot without rotation, said float means having a rectangular slot, a rotatable twisted strip extending vertically in said pot parallel to said guiding means, said strip having a single twist and being slidably received in said slot of said float means, whereby said strip is turned as said float means rises or falls with the level of liquid in said pot and means for coupling said strip with said indicator to impart rotary movement of said strip to said indicator.

6. An insulated pot according to claim 5, in which said coupling means comprises a coupling member rotatably mounted in said cap and having two downwardly projecting portions with a space between them, an upper end portion of said twisted strip being received in said space, whereby rotary movement of said strip is imparted to said coupling member, said indicator being affixed to said coupling member to rotate therewith.

7. An insulating pot according to claim 5, in which said guiding means comprises said liquid discharge pipe that extends from said cap down into said pot, said float means being slidable up and down on said pipe, and a bracket on said pipe rotatably supporting said twisted strip at its lower end.

8. An insulated pot according to claim 1, in which a thermal insulating ball of a diameter slightly larger than the inner diameter of said pipe normally closes the upper end of said pipe to insulate liquid in said pipe thermally from the environment, and is displaceable upwardly to permit discharge of liquid through said pipe and spout.

* * * * *